United States Patent [19]
Yasuda

[11] Patent Number: 4,603,094
[45] Date of Patent: Jul. 29, 1986

[54] ALKALINE STORAGE BATTERY

[75] Inventor: Hideo Yasuda, Kyoto, Japan

[73] Assignee: Japan Storage Battery Company Limited, Kyoto, Japan

[21] Appl. No.: 628,083

[22] Filed: Jul. 5, 1984

[30] Foreign Application Priority Data

Jul. 5, 1983 [JP] Japan .................... 58-122779
Nov. 25, 1983 [JP] Japan .................... 58-222734

[51] Int. Cl.$^4$ .................................. H01M 10/24
[52] U.S. Cl. .................... 429/91; 429/206; 429/218; 429/223
[58] Field of Search ........... 429/223, 218, 232, 90–93, 429/206, 222; 252/182.1

[56] References Cited

U.S. PATENT DOCUMENTS

| | | | |
|---|---|---|---|
| 2,988,590 | 6/1961 | Andre | 429/93 |
| 3,081,366 | 3/1963 | Belove | 429/99 X |
| 3,203,879 | 8/1965 | Mueller | 429/223 X |
| 3,211,587 | 10/1965 | Shair et al. | 429/223 X |
| 3,230,113 | 1/1966 | Herold | 429/223 X |
| 3,762,959 | 10/1973 | McCoy | 429/223 X |
| 3,951,686 | 4/1976 | Ness et al. | 429/223 X |
| 3,977,908 | 8/1976 | Kitai | 429/91 |
| 4,029,132 | 6/1977 | Jackowitz et al. | 429/223 X |
| 4,130,696 | 12/1978 | Gunther | 429/223 |
| 4,289,836 | 9/1981 | Lemelson | 429/93 X |

Primary Examiner—Anthony Skapars
Attorney, Agent, or Firm—Sughrue, Mion, Zinn, Macpeak and Seas

[57] ABSTRACT

An alkaline storage battery is described including a positive electrode comprising as an active material a cobalt hydroxide base containing from about 15 to 65 wt % nickel hydroxide and a negative electrode comprising zinc or cadmium as an active material; the alkaline storage battery can be charged rapidly, has a high energy density, and the residual capacity of the battery can be easily measured by detection of the electromotive force of the battery.

8 Claims, 12 Drawing Figures

ALKALINE STORAGE BATTERY

FIELD OF THE INVENTION

The present invention relates to an alkaline storage battery employing zinc, cadmium, or iron as the negative electrode, and more particularly, to an alkaline storage battery capable of being charged rapidly, having a high energy density, and whose residual capacity can be easily measured by detection of its electromotive force.

BACKGROUND OF THE INVENTION

Storage batteries now in use include lead acid battery, nickel-cadmium battery and silver oxide-zinc battery. Presently, these batteries are selected for use according to the particular intended application. Recently, applications of storage batteries have expanded, e.g., they are used as a power source for electric automobiles, from the viewpoint of overcoming environmental pollution problems, and as portable power sources with respect to miniaturization and weight reduction in use of electronic equipment. Improvement in high energy density and in rapid charge performance characteristics is very desirable for storage batteries for such applications. Although development of various storage batteries, e.g., nickel-zinc battery and sodium-sulfur battery, has been directed towards high energy density, it is very difficult to put them into practical use.

Since nickel-zinc battery can have a high energy density as compared with conventional lead acid battery and nickel-cadmium battery, the battery would be expected to provide desired characteristics. However, in the battery there are various unsolved problems, such as dendrite growth, shape change, passivation, and densification of zinc negative electrodes. Sodium-sulfur battery cannot avoid difficulties in achieving a long life solid electrolyte.

Therefore, in reality only lead acid and nickel-cadmium batteries are in practical use as storage battery. Nickel-cadmium battery is highly reliable as compared with lead acid battery and also can be easily sealed, and thus the battery has recently come into wide use as portable power sources for video receivers, toys, and the like. When the battery is overcharged, oxygen evolves on the positive electrode. Although the evolving oxygen gas is consumed by combination with cadmium of the negative electrode, it is necessary to increase the partial pressure of oxygen to accelerate the rate of oxygen consumption in a cell so that sealed nickel-cadmium battery must now be manufactured using high pressure battery cases. Increasingly rapid charging can be carried out with an increase in pressure in the battery case. Generally, for a sealed type battery as charged rapidly at a rate more than 0.3 c, where the letter "c" is used to describe current rates in terms of a fraction of the capacity rating of the battery, a cylindrical battery case made of nickel-plated iron plate and withstanding high pressure is used, and the case is provided with a safety valve operating at pressure of 5 to 15 kg/cm$^2$.

For increasing the energy density of nickel-cadmium batteries, a rectangular battery case is more advantageous than the cylindrical type one, and this is particularly the case when two or more battery cases are connected for use together. With a rectangular case, however, when the pressure becomes more than about 1 kg/cm$^2$, even an iron battery case may be deformed, and a battery case made of synthetic resin may be broken. For prevention of such problems, such rectangular cases are provided with a safety valve operating at low pressure. However, when the battery is charged rapidly, the liquid leaks through the safety valve, soiling the peripheral part of battery and shortening the cycle life of the battery. Therefore, in practice it is actually impossible to overcharge a sealed type nickel-cadmium battery employing a rectangular battery case at 0.3 c rate and over without damage.

For prevention of overcharging, a method has been considered for stopping the charging of a battery when a voltage at which oxygen begins to evolve from the positive electrode is reached. However, the method lacks reliability, because there is only a small difference between the potential for oxygen evolution at the end period of charging and the potential of the charge process, and the difference becomes smaller when the temperature rises.

There is also a method for stopping charging involving detecting oxygen evolving from the positive electrode by so-called third electrode. However, the ability for detecting oxygen evolving from the positive electrode lacks reliability, and also it is troublesome to insert the third electrode into the battery.

When the nickel-cadmium battery is charged rapidly without overcharging, and is repeatedly used, two other significant problems are encountered.

First, the nickel hydroxide which is the active material of the positive electrode has a low charge efficiency, and it does not recover its original charged state unless at least 110 to 120% of the preceding discharge capacity is charged thereto.

Second, in the positive electrode comprising nickel hydroxide, when it is not used for a long time, a phenomenon termed an "aging effect" occurs, and oxygen evolves from the time of the initial period of charging, significantly lowering the charge efficiency and decreasing the discharge capacity, is the other problem. To overcome the "aging effect", generally the battery must be overcharged to the point of oxygen evolution, and repeat charge and discharge must be carried out.

Thus, it is in practice actually impossible to rapidly charge the rectangular nickel-cadmium battery at 0.3 c rate and over, and therefore the successful practical use of such a battery has not yet been fully realized so far. Other batteries employing nickel hydroxide positive electrodes, e.g., nickel-zinc battery, also have such unsolved problems. As mentioned above, the zinc negative electrode itself has a basic problem that its cycle life is short even when the battery is charged at a low rate under 0.1 c.

SUMMARY OF THE INVENTION

An object of the present invention is to provide a high energy density battery which can be charged rapidly.

A further object of the present invention is to provide a storage battery whose residual capacity can be easily detected, even while the battery is in use.

These objects are achieved by an alkaline storage battery comprising as an active material a cobalt hydroxide containing from about 15 to 65% by weight nickel hydroxide as the positive electrode thereof.

DETAILED DESCRIPTION OF THE INVENTION

The present invention overcomes defects of the conventional alkaline storage batteries employing a positive electrode based on nickel hydroxide. The present invention is directed to alkaline batteries employing as an active material a cobalt hydroxide base containing from about 15 to 65% by weight of nickel hydroxide as the positive electrode and employing zinc, cadmium, iron, or the like as the negative electrode. According to this invention, high energy density batteries nearly completely free from defects of conventional alkaline storage batteries and capable of being rapidly charged can be obtained, and the residual capacity of such batteries can be easily measured by detection of the electromotive force of the battery.

Examples and effects of this invention are described in detail below.

The active material of the positive electrode employed in the invention including a cobalt hydroxide base containing from about 15 to 65 wt % of nickel hydroxide (based on the total amount of cobalt and nickel) can be manufactured by several methods, such as the following methods. Therein, the content of nickel hydroxide is expressed by the ratio of the amount of nickel metal to the total amount of cobalt metal and nickel metal in the active material. That is, Content of Nickel = (Ni/Co + Ni) × 100 (%)

(a) A method comprising heat-treating a mixture of cobalt nitrate and nickel nitrate having a nickel content of from about 15 to 65 wt %, or an aqueous solution of the mixture, at from 110 to 310° C. for about 1 hour, and then treating the heat-treated mixture with an aqueous alkaline solution, e.g., an aqueous sodium or potassium hydroxide solution or a mixed solution of these hydroxides.

(b) A method comprising mixing a mixed solution of, e.g., cobalt and nickel nitrates, sulfates, or chlorides, or of corresponding solid cobalt and nickel salts, which has a nickel content of from about 15 to 65 wt %, with an aqueous alkaline solution, e.g., an aqueous sodium or potassium hydroxide solution or a mixed solution of these hydroxides.

(c) A method comprising heat-treating mixed organic salts such as mixed cobalt and nickel formates or oxalates, or mixed ammonium complexes of cobalt and nickel, which have a nickel content of from about 15 to 65 wt %.

(d) A method comprising treating a mixed solution of cobalt and nickel, e.g., a mixed solution of cobalt and nickel sulfates, chlorides or nitrates which has a nickel content of from about 15 to 65 wt %, with an oxidizing agent, e.g., sodium hypochlorite, bromine or potassium peroxosulfate and an aqueous alkaline solution, e.g., an aqueous sodium or potassium hydroxide solution or a mixed solution of these hydroxides.

(e) A method comprising electrolyzing an aqueous mixed solution of cobalt and nickel nitrates which has a nickel content of from about 15 to 65 wt % to deposit these hydroxides on the surface of a cathode.

(f) A method comprising treating mixed crystals, e.g., a $CoSO_4$-$NiSO_4$-, $CoCl_2$-$NiCl_2$- or $Co(NO_3)_2$-$Ni(NO_3)_2$-containing a nickel content of from about 15 to 65 wt % with an aqueous alkaline solution, e.g., an aqueous sodium or potassium hydroxide solution or a mixed solution of these hydroxides.

(g) A method comprising treating a mixed solution of cobalt and nickel, e.g., an aqueous $CoSO_4$-$NiSO_4$-, $CoCl_2$-$NiCl_2$-, or $Co(NO_3)_2$-$Ni(NO_3)_2$- containing a nickel content of from about 15 to 65 wt % with an alkali or alkaline earth metal such as sodium, potassium, or calcium or an amalgam of such metals.

This invention can be considered to be equivalent to a method for adding a large amount of cobalt hydroxide to a small amount of nickel hydroxide. The effect of cobalt hydroxide addition into nickel hydroxide is reported in the literatures such as *Denki Kagaku,* Vol. 31, page 238 (1963), *GS News,* Vol. 37, page 84 (1978), and *Proc. Annu. Power Source Conf.,* Vol. 13, page 75 (1959). According to above-mentioned literatures, the effect of cobalt hydroxide addition into nickel hydroxide is considered as follows from the results of the potential behavior, X-ray diffraction analysis and chemical analysis. When cobalt hydroxide is added into nickel hydroxide, cobalt hydroxide forms solid solution with nickel hydroxide within about 20 wt %, resulting in the increase of surface area and disordering of crystal lattice. Therefore, the utilization of active material increases with increasing cobalt content. However, cobalt hydroxide beyond 20 wt % content does not form solid solution with nickel hydroxide and exists as $Co(OH)_2$ in the active material. When the cobalt hydroxide is once charged, it changes mostly to cobalt oxyhydroxide which hardly discharges. Furthermore, the properties of cobalt hydroxide itself is chemically unstable, and so the cobalt hydroxide is gradually oxidized by dissolving oxygen in an electrolyte, thus changing to an inactive higher oxide such as $CoHO_2$. So the utilization of active material beyond 20 wt % cobalt content decreases with increasing cobalt content as the electrode potential lowers. Therefore, it has not at all been considered so far to utilize a positive electrode comprising cobalt hydroxide or a positive electrode comprising nickel hydroxide with cobalt hydroxide added in an amount of above 20 wt % in an actual battery.

The present invention was achieved on the basis of the discovery that, as a result of preparation of various positive electrodes comprising cobalt hydroxide containing nickel hydroxide by various methods outside of the scope of conventional thought, and then detailed investigation of electrochemical properties of the electrodes in an alkaline electrolyte, cobalt hydroxide containing nickel hydroxide has certain beneficial characteristics which had not been previously realized.

First, it has been discovered that when the positive electrode comprising cobalt hydroxide having a nickel content in it of from about 15 to 65 wt % is charged, oxygen evolution, which is a competitive reaction, not only is not at all detected until the end of the period of charging, but also discharge of the electrode following the charging can be readily carried out, and its ampere hour efficiency is excellent and approximates 100% after many repeated charge and discharge cycles.

Furthermore, it has been discovered that the charge and discharge reaction of the positive electrode comprising cobalt hydroxide with nickel hydroxide added becomes a clear homogeneous phase redox system as does the discharge reaction of positive electrode comprising manganese dioxide in dry batteries.

The positive electrode of the invention having these beneficial characteristics can be manufactured by various methods as mentioned above. The potential behavior of the electrode varies more or less with the manufacturing methods, and are broadly divided into two kinds. Representative examples are described below.

First, a sintered nickel plaque having a porosity of about 80% was vacuum impregnated with an aqueous mixed solution of cobalt and nickel nitrates (pH=1, sp. gr.=1.60 (at 20° C.)) and then heat-treated at 230° C. for 1 hour. The above process was repeated seven times, and then the plaque was dipped into an aqueous potassium hydroxide solution having a sp. gr. of 1.25 (at 20° C.) for 1 hour. Subsequently, the plaque, after being washed with hot water, was dried at 100° C. for 1 hour. Thus, the positive electrode plate was prepared by the manufacturing method (a) noted above.

Next, a sintered nickel plaque having a porosity of about 80% was vacuum impregnated with the same aqueous mixed solution of cobalt and nickel nitrates as in the above case and then the plaque was dipped into an aqueous potassium hydroxide solution having a sp. gr. of 1.25 (at 20° C.) for 20 minutes. After that, the plaque was washed with hot water and then dried at 100° C. for 1 hour. The above process was repeated seven times. Thus, the positive electrodes were prepared by the manufacturing methods (a) and (b) noted above.

Figure 1:
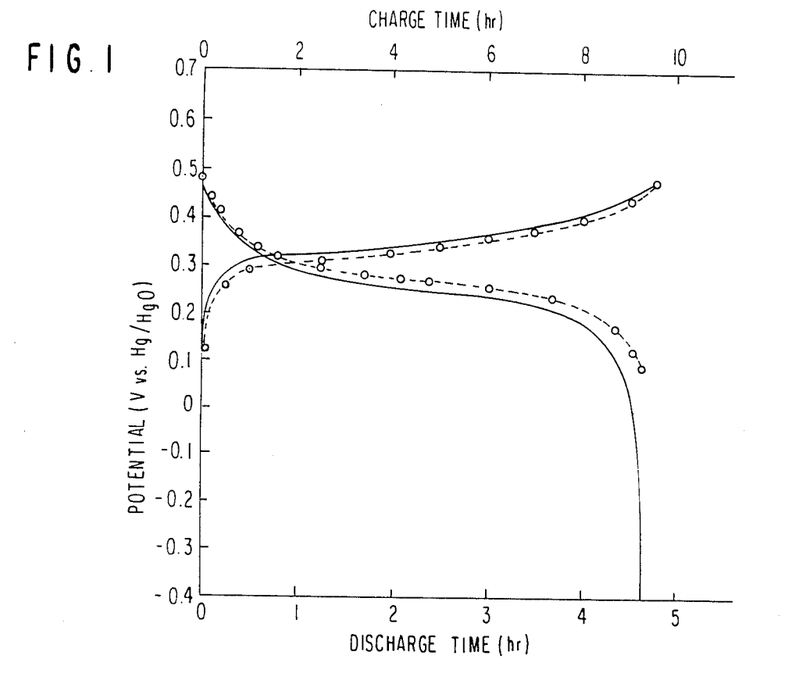
FIG. 1 and FIG. 2 show charge and discharge characteristics of positive electrodes made in accordance with the invention, and the change in the open circuit potential thereof.
Figure 2:
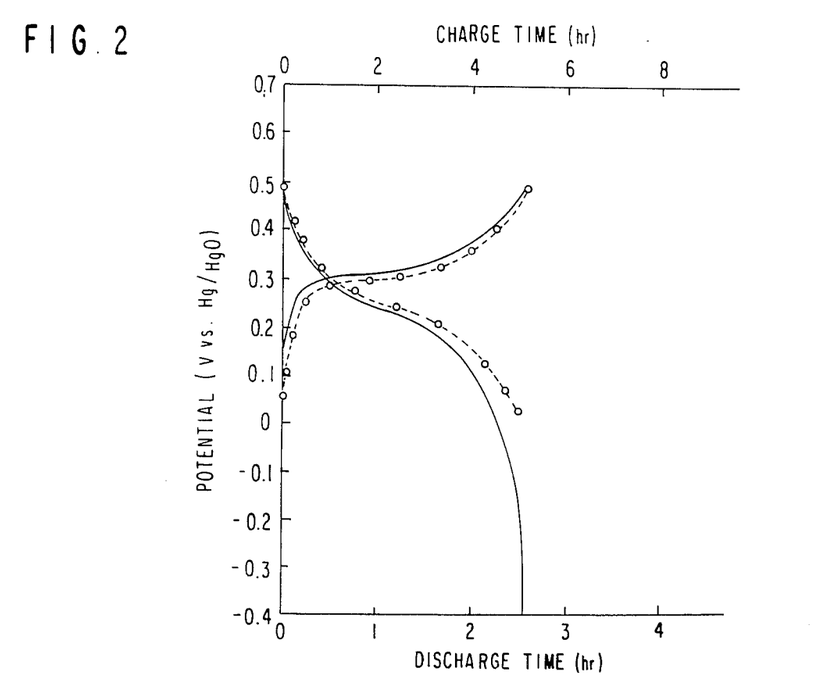

Using two nickel metal plates as counter electrodes and an aqueous KOH solution having a sp. gr. of 1.25 (20° C.) as the electrolyte, these positive electrodes were charged at 25° C. and at a current of 0.1 cA (nominal capacity is calculated on the assumption that active materials possessed by the positive nickel plaque were all $Co(Ni)(OH)_2$ and the charge and discharge reaction followed a one electron change reaction) for 16 hours. After charging, the electrodes were discharged to $-0.8$ V (vs Hg/HgO) at 0.2 cA. 2 cycles of such formation were carried out. Subsequently, the electrodes were charged at 0.1 cA until bubbles of oxygen began to evolve, and after that, they were discharged to $-0.8$ V (vs Hg/HgO) at 0.2 cA. The charge and discharge characteristics of the electrodes are shown in FIG. 1 and FIG. 2, respectively. In the charge and discharge processes, the current was temporarily suspended and the open circuit voltage was measured at a time point after 20 minutes during each suspension. The change in the above-mentioned open circuit voltage is shown by dotted lines in the figures. The comparison of FIGS. 1 and 2 indicates that the charge and discharge potential of the positive electrode prepared by the manufacturing method (a) in FIG. 1 is nobler about 50 mV than that of the same electrode prepared by the method (b) in FIG. 2. As a result of investigation of the potentials of positive electrodes prepared by various methods, the electrodes prepared by the methods (a), (c) and (d) proved to have higher charge and discharge potentials than have the plates prepared by the methods (b), (e) and (g). This may be because higher oxides such as $Co_3O_4$ are partly formed in the methods (a), (c) and (d).

Two important aspects of the positive electrode made in accordance with this invention are apparent based on a review of FIGS. 1 and 2. It is clear that the ampere hour efficiency determined based on (1) the amount of charged electricity when charging is cut at a time point where oxygen bubbles begin to evolve on the surface of electrode plate, and (2) the amount of subsequently discharged electricity, approximates 100%. This indicates that oxygen evolution, which is a competitive reaction during charging, does not take place to a great extent. Thus, there is a very large difference between the positive electrode of this invention and conventional positive electrodes comprising nickel hydroxide when it is considered that, when at least 30 to 60% of the discharge capacity of the conventional plate is charged, oxygen begins to evolve.

Figure 3:
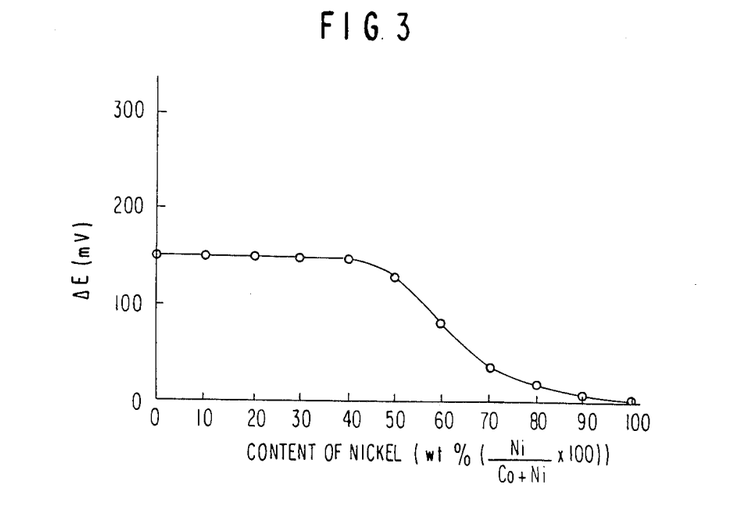
FIG. 3 shows the relation between the potential difference ($\Delta E$) between the potential at the end period of charge and that at 5 hours after beginning of charge and the content of nickel in the active material of the positive electrode.

For investigation of the mixing ratio of cobalt hydroxide and nickel hydroxide required for displaying such desirable characteristics, first, several mixed solutions of cobalt and nickel nitrates having different mixing ratios of both were prepared. The solutions were heated at 230° C. for 1 hour and the nitrates were decomposed. The resulting compounds were dipped into an aqueous alkaline solution to produce an active material. 100 parts of the resulting active material and 25 parts of graphite were mixed and pressure molded. The molded compound was wrapped in a nickel screen and further compression molded to provide a tablet type positive electrode, which was charged at 50° C. and at 0.1 cA for 16 hours using two nickel metal plates as counter electrode and an aqueous potassium hydroxide solution having a sp. gr. of 1.25 (20° C.) as the electrolyte. The relation between the potential difference ΔE between the potential at the end of the period of charging and the potential after passage of 5 hours from starting of charging and the content of nickel in the active material is shown in FIG. 3. It is seen based on FIG. 3 that when the content of nickel exceeds 65 wt %, the potential difference ΔE becomes 50 mV and less. As a result of careful observation of the state of oxygen evolution in the process of charging, when the content of nickel was 65 wt % and less, evolution of oxygen was hardly observed before a potential when oxygen mainly began to evolve, that is, in the process of charge of the active material. When the content of nickel was less than 15 wt %, the discharge capacity of the electrode decreased markedly and utilization of the active material became less than 30%, so that such an electrode with a low content of nickel was not preferred.

Furthermore, it is important that the potential of the positive electrode in charging and discharging shows an S-type curve, that the open circuit potential also shows a clear S-type curve, and that the change in the open circuit potential is very large, such as about 400 mV. Such a high value cannot be expected for conventional positive electrodes comprising nickel hydroxide.

In the charge and discharge reaction of the conventional positive electrode based on nickel hydroxide, proton (H+) takes part, as shown in the following equation (1).

$$Ni(OH)_2 \rightleftharpoons NiOOH + H^+ + e^- \qquad (1)$$

Figure 4:
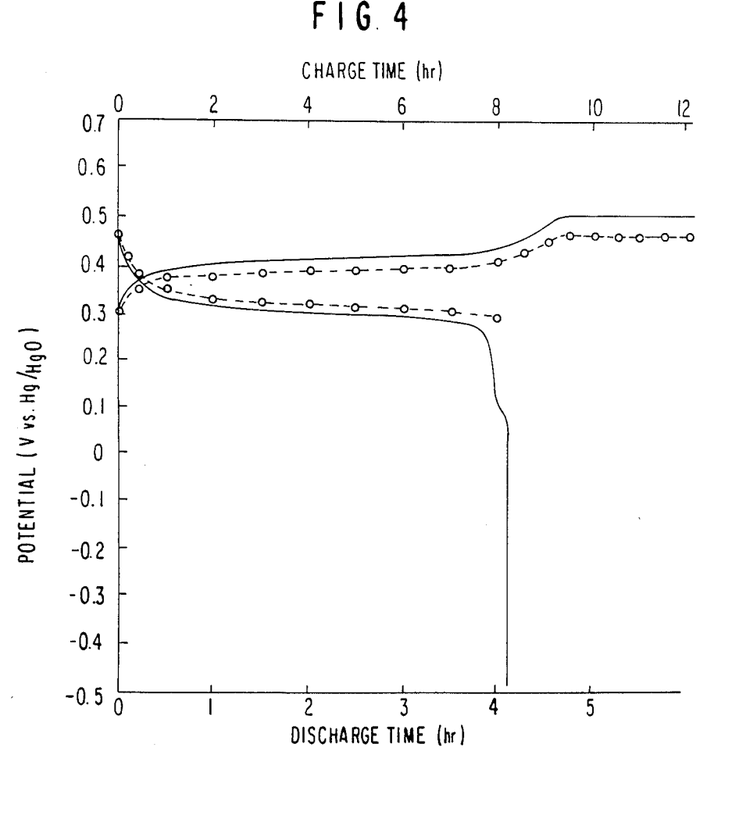
FIG. 4 shows charge and discharge characteristics of conventional nickel hydroxide positive electrode containing 20% by weight cobalt hydroxide and the change in the open circuit potential.

The charge and discharge reaction takes a reaction mechanism in which proton diffuses in the solid phase in the progress of the charging and discharging reactions. $Ni^{2+}$ and $Ni^{3+}$ form a solid solution, and the potential of the positive electrode depends on the mol ratio of $Ni^{3+}/Ni^{2+}$, so that the open circuit potential of the plate is expected to show an S-type curve according to the progress of the charging and discharging reactions. However, as the charge products of $Ni(OH)_2$ that is the actual active material of positive electrode, nearly trivalent β-NiOOH and 3.2–3.7-valent γ-NiOOH are formed, and further higher nickel oxides are also formed. On the other hand, as the discharge products, hydroxides having different crystal structure such as β-Ni(OH)$_2$ and α-Ni(OH)$_2$ are formed, so that the change in the open circuit potential is 50–150 mV at utmost. For comparison, a sintered positive electrode comprising nickel hydroxide having a cobalt content in it of 20 wt % was prepared as the conventional positive electrode. Charge and discharge characteristics of the electrode when it is charged at 25° C. and at 0.1 cA for 12 hours and then discharged at 0.2 cA continuously, and the change in the open circuit potential of the electrode measured at a point in time 20 minutes after the current is suspended in the course of charging and discharging processes are shown in FIG. 4 by solid lines and dotted lines, respectively. Comparison of FIG. 4 with FIGS. 1 and 2 indicates that the positive electrode made in accordance with the present invention has an extremely large change in the open circuit potential as compared with the conventional electrode.

Figure 5:
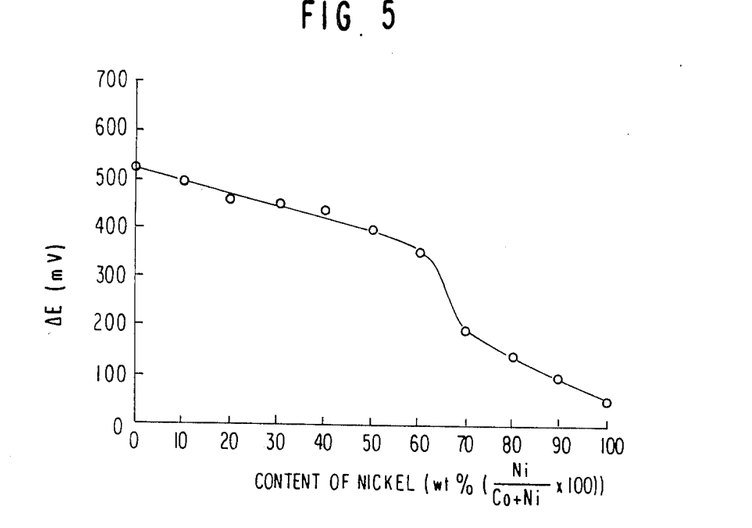
FIG. 5 shows the relation between the potential difference ($\Delta E$) of the positive electrode between before the beginning of discharge and after the completion of discharge and the content of nickel in the active material of the electrode.

The charging and discharging reaction of the active material of the positive electrode made in accordance with the present invention is considered a clear homogeneous phase redox system because a change in the open circuit potential shows a clear S-type curve. For investigation of the ratio of cobalt hydroxide to nickel hydroxide for causing such a clear homogeneous phase redox system, the same positive electrodes as used in FIG. 3 were charged at 25° C. and at 0.1 cA for 16 hours and then discharged to −0.8 V (vs Hg/HgO) at 0.2 cA. The relation between the difference (ΔE) of the open circuit potential between before the beginning of discharge and after the completion of discharge and the content of nickel in the active material was determined. The result is shown in FIG. 5. It is found from FIG. 5 that, when the content of nickel is about 65 wt % and less, the value of ΔE is large, exceeding 250 mV, but, when the content exceeds 70 wt %, the value becomes less than 200 mV. With the active material having a nickel content of less than 15%, the discharge capacity was not only lowered significantly, but also the difference of open circuit potentials became small and unstable when the charge and discharge cycle was repeated. Thus, as the current of nickel becomes smaller than 65 wt %, the value of ΔE increases rapidly. This is thought to occur because the active materials, cobale hydroxide and nickel hydroxide, which take part in the charging and discharging reaction, form a uniform solid solution in this region of mixing ratio, such that charge and discharge products also form a more uniform solid phase and the potential of the electrode becomes determined by the formula (2).

$$E = E_o + RT/F \ln[Co(Ni)^{3+}solid/Co(Ni)^{2+}solid] \qquad (2)$$

On the other hand, when the content of nickel exceeds about 65 wt %, it seems that β-NiOOH and γ-NiOOH are formed as charge products, and β-Ni(OH)$_2$ and α-Ni(OH)$_2$ are formed as discharge products, and thus more than two phases are formed, so that the properties of heterogeneous redox system begin to appear and a change in the open circuit potential becomes small.

The fact that ΔE exceeds 250 mV in the region having a nickel content of about 65 wt % and less is something which cannot be expected with the conventional positive electrode comprising nickel hydroxide, and this fact seems to be very significant. Measurement of the electromotive force of the battery permits the residual capacity to be determined. This is an important aspect of this invention, and the reason for this is explained below.

It has been reported to be very important that, in using a storage battery as a power source, e.g., as an electric source for a video receiver or an electric motor car, the residual capacity of the battery is desirably determined every time it is used. However, conventional nickel-cadmium batteries are mostly of the sealed type when they are used as a portable power source, and it is difficult to attach a sensor to the inside of a battery. Therefore, such batteries are charged before being used and a capacity meter for the battery is not used for such batteries. When the conventional nickel-cadmium batteries are used for engine-starting applications or standby and stationary applications, these batteries are ordinarily maintained in a fully charged state. This means that it is not always necessary to know the residual capacity. However, such a method is not always desirable and it is not unnecessary to know the residual capacity of a battery before its use. In fact, an attempt has been carried out to measure the open circuit potential of a nickel-cadmium battery to determine its residual capacity as is done for a lead acid battery. The attempt has not been carried out successfully because the change in the open circuit potential caused by a change in capacity is too small. In alkaline storage batteries employing an active material with a cobalt hydroxide base having a nickel content in it of from about 15 to 65 wt % as the positive electrode in accordance with the invention, the potential difference ΔE between the charge completion time (i.e., the discharge beginning time) and the discharge completion time is 250 mV or more, and the potential of the electrode changes continuously with the charging or discharging time. Therefore, according to the present invention, it is easily possible to determine the residual capacity of the battery by measuring the electromotive force of the battery.

Specific examples of positive electrode made in accordance with the present invention are described below. However, the invention is not limited to these examples.

EXAMPLE 1

A sintered nickel plaque having a porosity of about 80% was vacuum impregnated with an aqueous mixed solution (pH=1, sp. gr.=1.60 (20° C.)) of cobalt nitrate and nickel nitrate having a nickel content [{Ni/(Co+Ni)}×100] of 50 wt % at 80° C. and then was heat-treated at 230° C. for 1 hour. This process was repeated five times. After that, the plaque was dipped into an aqueous potassium hydroxide solution (sp. gr.=1.25 (20° C.)) at 80° C. for 1 hour. Subsequently, the plaque was washed with hot water and then dried at 110° C. for 1 hour.

EXAMPLE 2

A mixture of cobalt nitrate ($Co(NO_3)_2.6H_2O$) and nickel nitrate ($Ni(NO_3)_2.6H_2O$) having a mixing ratio by weight of 1/1 was heated to 80° C. and stirred well in a molten state and subsequently was heat-treated at 250° C. for 1 hour. The resulting product was dipped and treated in an aqueous sodium hydroxide solution (sp. gr.=1.25 (20° C.)) at 80° C. for 1 hour. After that, the product was washed with hot water and then dried at 100° C. for 1 hour. The product was pulverized with a pulverizer (viz., a ball mill) into a powder which passed through a 200 mesh screen. 100 parts of the powder, 25 parts of graphite and 60 parts of propylene glycol were kneaded well and then were blended with 2 parts of an aqueous dispersion of polytetrafluoroethylene powder having a concentration of 60%. The resulting mixture was further kneaded and then molded into a sheet-shaped article with a pressure roller. The sheet-shaped article was attached to both sides of a nickel screen of 20 mesh under pressure and then dried at 120° C. for 1 hour.

EXAMPLE 3

A sintered nickel plaque having a porosity of about 80% was vacuum impregnated with an aqueous mixed solution (pH=1, sp. gr.=1.60 (20° C.)) of cobalt nitrate and nickel nitrate having a nickel content [{Ni/(Co+Ni)}×100] of 50 wt % at 80° C. and then the plaque was dipped and treated in an aqueous potassium hydroxide solution (sp. gr.=1.25 (20° C.)) at 80° C. for 1 hour. Subsequently, the plaque was washed with hot water and then dried at 100° C. for 1 hour. This process was repeated five times.

EXAMPLE 4

Reaction of ammonia gas with a mixed salt of 0.5 M of cobalt formate ($Co(HCO_2)_2$) and 0.5 M of nickel formate ($Ni(HCO_2)_2$) resulted in formation of a complex salt of tetramine cobalt and tetramine nickel. The complex salt was dissolved in hot water and stirred. After that, the solution was heat-treated at 200° C. for 2 hours and then the resulting product was pulverized with a ball mill into powder passing through a 200 mesh screen. 100 parts of the powder and 25 parts of graphite were mixed and then pressure-molded. The molded article was wrapped in a 100 mesh nickel screen and then pressure-molded again.

EXAMPLE 5

6 Liters of a 3 M aqueous solution of sodium hydroxide containing 0.2 M of potassium peroxosulfate ($K_2S_2O_8$) was gradually added to 2 liters of an aqueous mixed solution of 1 M cobalt nitrate and 1 M nickel nitrate while stirring at 20° C., and then the resulting solution was allowed to stand for 2 hours. After that, the resulting precipitate was filtered with a filter and the precipitate, after being washed with hot water, was dried at 110° C. for 1 hour. The dried precipitate was pulverized with a ball mill into powder passing through a 200 mesh screen. A mixed powder of 100 parts of the foregoing powder and 15 parts of carbonyl nickel powder was kneaded together with 40 parts of an aqueous 1 wt % solution of carboxymethyl cellulose to form a paste. Then, this paste was directly packed into a nickel foam (trade name Celmet, manufactured by Sumitomo Denko K. K.) having a thickness of 1 mm, and then dried at 100° C. for 1 hour. Subsequently, the foam was dipped into an aqueous 60% dispersion of polytetrafluoroethylene powder for 1 minute and then dried at 80° C. for 1 hour.

EXAMPLE 6

A sintered nickel plaque having a porosity of about 80% was dipped into an aqueous mixed solution (pH=1, sp. gr.=1.20 (20° C.)) of cobalt nitrate and nickel nitrate having a nickel content [{Ni/(Co+Ni)}100] of 50 wt % and electrochemical impregnation was carried out by cathodizing the plaque at a current density of 100 mA/cm$^2$ for 2 hours employing two nickel metal plates as counter electrodes. After that, the electrode was washed with hot water and then dried at 110° C. for 1 hour.

EXAMPLE 7

Heating of an aqueous mixed solution of cobalt sulfate ($CoSO_4.6H_2O$) and nickel sulfate ($NiSO_4.6H_2O$) in a mixing ratio by weight of 1/1 resulted in formation of cobalt-nickel mixed crystals $Co(Ni)SO_4.6H_2O$. Then, the product was dipped into an aqueous potassium hydroxide solution (sp. gr.=1.22 (20° C.)) at 30° C. for 2 hours. The resulting product was washed with hot water and then dried at 100° C. for 1 hour. After that, this product was pulverized with a ball mill into powder passing through a 200 mesh screen. 100 parts of the powder, 25 parts of graphite, and 60 parts of polypropylene glycol were well kneaded, and then further blended with 2 parts of an aqueous 60% dispersion of polytetrafluoroethylene powder. The mixture was further kneaded and then molded into a sheet-shaped product with a pressure roller. The sheet-shaped product was attached to both sides of a 20 mesh nickel screen under pressure and then dried at 120° C. for 5 hours.

EXAMPLE 8

Amalgam containing 0.8 wt % of potassium was gradually added to a mixed solution of 1 M of cobalt nitrate and 1 M of nickel nitrate at 20° C. while stirring, and then the precipitated product was washed with hot water and dried at 110° C. for 2 hours. The dry product was pulverized with a ball mill into powder passing through a 200 mesh screen. 100 parts of the powder, 25 parts of graphite and 60 parts of polypropylene glycol were kneaded well and then blended with 2 parts of an aqueous 60% dispersion of polytetrafluoroethylene powder. The mixture was further kneaded and then molded into a sheet-shaped article with a pressure roller. The sheet-shaped article was attached to both sides of a 20 mesh nickel screen under pressure and then dried at 150° C. for 1 hour.

Of the above Examples, active materials prepared by a method for heat-treating nitrates as in Examples 1 and 2, by a method for heat-treating organic salts as in Example 4, by a method for using an oxidizing agent as in Example 5, by a method of electrochemical impregnation as in Example 6, by a method for forming once mixed crystals of cobalt and nickel and then treating the mixed crystals with alkaline solution as in Example 7, and by a method for using amalgam with an alkali metal reacting with water to form $OH^-$ ions as in Example 8 were superior in utilization, to the one prepared by a method involving only treating an aqueous mixed acid solution of cobalt and nickel with an aqueous alkali solution as in Example 3. When an aqueous mixed acid solution containing cobalt ions and nickel ions is treated only with an aqueous alkaline solution as in Example 3, cobalt hydroxide begins to precipitate at a higher value of pH than the value of pH at which nickel hydroxide does. Therefore, formation of the hydroxides is somewhat selective and free cobalt hydroxide is formed, lowering the utilization of the active material.

In contrast to this, other methods seem to restrain formation of free cobalt hydroxide. In particular, positive electrode obtained by a method for using a sintered nickel plaque as a substrate for active material and heat-treating mixed nitrates of cobalt and nickel on the substrate as in Example 1 had a specially good utilization of about 90% (refer to FIG. 1). This seems, though not certain, to be because formation of free $Co(OH)_2$ is lessened for the above-mentioned heat-treatment, thus easily causing formation of a solid solution of cobalt hydroxide and nickel hydroxide according to the following equation (3).

$$Co(NO_3)_2 + Ni(NO_3)_2 4 + H_2O \rightarrow 2Co(Ni)(OH)_2 4 + HNO_3 \quad (3)$$

In this method, a basic nitrate containing an undecomposed nitrate, that is, $Co(Ni)NO_3 \cdot 2Co(Ni)(OH)_2$, is also formed, so that it is preferred that the heat-treatment is followed by a treatment with an aqueous alkaline solution to convert the basic nitrate into the hydroxide.

Next, an example of batteries employing positive electrodes prepared by the above-mentioned methods and effects of the batteries will be described, particularly with regard to batteries employing electrodes prepared in Example 1, as a representative example, and with zinc or cadmium as the negative electrodes.

Figure 6:
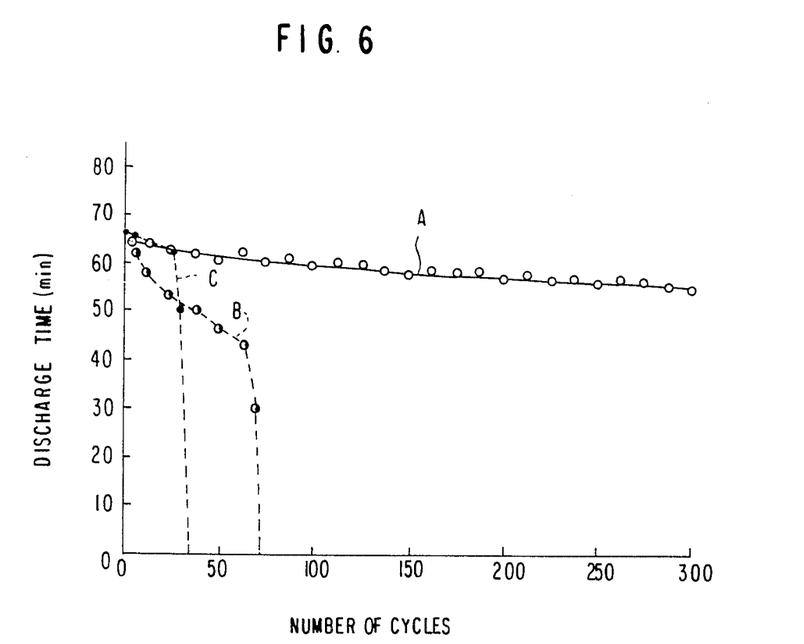
FIG. 6 shows the comparison of a cobalt (with nickel)-zinc battery A made in accordance with this invention with a conventional nickel-zinc batteries B and C in the transition of discharge capacity with process of charge and discharge cycles.

First, a cobalt (with nickel)-zinc battery employing zinc as the negative electrode is described. The zinc-negative electrode was prepared by kneading mixed powder comprising 80 parts of zinc oxide powder, 20 parts of zinc metal powder, 10 parts of calcium hydroxide powder, and 2 parts of mercuric oxide together with a mixture of 40 parts of an aqueous 5 wt % solution of polyvinyl alcohol and 2 parts of an aqueous 60% dispersion of polytetrafluoroethylene powder, applying the kneaded mixture to a 20 mesh copper screen to form an electrode, and then drying the plate at 110° C. for 1 hour. 4 zinc-negative electrodes (40×60×0.7 mm) each wrapped in four layers of cellophane separator, 3 positive electrodes (40×60×0.9 mm) prepared in Example 1 of this invention, and 9 ml of an aqueous 7 M potassium hydroxide solution containing 0.61 M of zinc oxide as an electrolyte were used for manufacturing a rectangular cobalt (with nickel)-zinc battery (A) provided with a safety valve having a nominal capacity of 3 Ah. A charge and discharge cycle comprising 1 cA charge to 1.95 V at 45° C. and followed by 1 cA discharge to 1.0 V was repeated for this battery. The transition of the charge and discharge capacity with the process of the cycles is shown in FIG. 6. For comparison, a battery (B) manufactured by the same method as in (A), except employing the conventional positive electrodes prepared using an aqueous mixed solution of cobalt nitrate and nickel nitrate having a cobalt content [{Co/(Ni+Co)}×100] of 10 wt %, is also shown in FIG. 6. Further, a battery (C) having the same contents as in (B) and whose charge and discharge cycle is carried out by a method comprising overcharge at 1 cA for 1.2 hours followed by discharge to 1.0 V is also shown in FIG. 6. As shown in FIG. 6, the discharge capacity of battery (A) is stable even after 300 cycles of charge and discharge, whereas the discharge capacity of conventional battery (B) gradually decreases and its charge and discharge cycles do not exceed 100 times. Further, the battery (C), which was overcharged during a charging and discharging cycles had a small cycle number, i.e., less than 50 times. When the batteries were dissected after cycles to investigate the inside, positive electrodes of batteries (B) and (C) changed from 0.9 mm to 1.0 mm and 1.1 mm in thickness, respectively, and expanded, and cellophane separators in the batteries deteriorated and weakened and were penetrated by dendrites of zinc. On the other hand, when the battery (A) made in accordance with this invention was dissected at a point in time after completion of 300 cycles of charging and discharging to investigate the inside, a change in the thickness of positive electrodes was not observed and the separators deteriorated only a little. Shape change of zinc negative electrode plates and dentrite growth of zinc were relatively small.

From the above results, the effects of the invention can be explained as follows. With conventional batteries, the discharge capacity gradually decreases unless they are overcharged, since nickel hydroxide has a relatively low charge efficiency as compared with the zinc negative electrode. In this process also, a small amount of oxygen evolves on the positive electrode plate during charging, so that the separators are oxidized and deteriorated by evolving oxygen. For prevention of a decrease in capacity, overcharge in an amount of at least 110 to 120% of discharge capacity must be carried out at every cycle. Thus, however much the capacity of zinc negative electrode, to be accurate, the amount of chargeable zinc oxide may be contained, chargeable zinc oxide disappears and hydrogen evolves from the zinc negative electrode before completion of charge after about 20 cycles. When hydrogen evolves from the zinc electrode like this, heat generation not only increases but also the overvoltage of zinc negative electrode increases, accelerating markedly the dendrite growth of the zinc. Further, deterioration of separators due to oxygen generated by overcharge is accelerated with increasing heat generation, and furthermore, shortcircuiting of batteries due to penetration of dendrites through separators easily occurs as a result of overcharging. In addition, expansion of positive electrodes leads to compression of zinc negative electrodes, causing densification of zinc and shorter life of the batteries.

On the other hand, with batteries made in accordance with this invention, the positive electrodes have an extremely good charge efficiency, deterioration of separators due to oxygen not only is restrained to the minimum, but also the dendrite growth of the zinc caused by concentration of current density due to staying of oxygen gas in the electrode plate or in the separator is restrained. Absence of expansion of positive electrodes due to charging and discharging leads to non-compression of negative electrodes, reducing the densification of zinc and causing a longer life of batteries. In addition, the fact that positive electrode made in accordance with this invention has an extremely high charge efficiency, which is equivalent to that of the negative zinc electrode, means that there is no necessity for overcharging such as is essentially required for conventional nickel-zinc battery. In addition, this fact also means that there is no necessity of excess zinc oxide that is excess active material possessed by a negative electrode for prevention of hydrogen evolution on the plate in overcharging the conventional battery. Therefore, it becomes possible to increase the energy density of the negative electrode, and the dendrite growth of zinc which easily occurs during hydrogen evolution in overcharging a battery can be restrained in the battery made in accordance with this invention. These are all desirable effects obtained by combination of positive electrode made in accordance with this invention with negative zinc electrode.

In addition, it becomes possible to control the charging by detection of the voltage, since the oxygen evolution potential of the positive electrode can be easily detected.

As mentioned above, it is possible to provide high energy-density, long-life storage battery by employing positive electrode that is extremely efficient in charging and comprises an active material with a cobalt hydroxide base containing from about 15 to 65 wt % of nickel hydroxide and zinc negative electrode.

Next, an example of alkaline battery employing cadmium as the negative electrode is described below.

Figure 7:
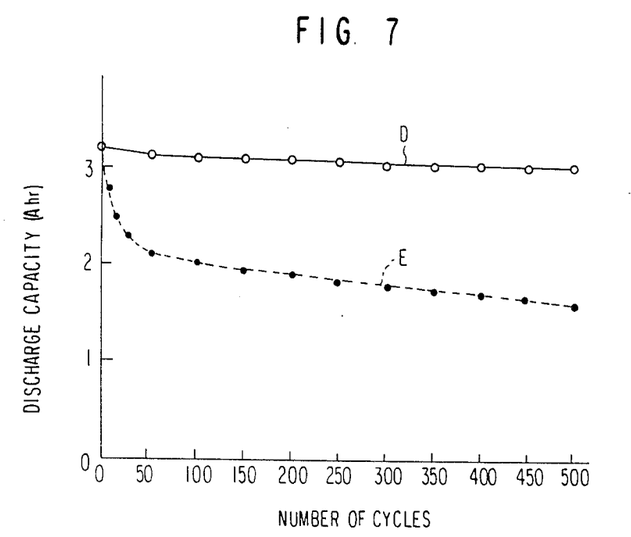
FIG. 7 shows the comparison of a cobalt (with nickel)-cadmium battery D made in accordance with this invention with a conventional nickel-cadmium battery E with respect to the change in the transition discharge capacity as the number of charge and discharge cycles increases.
Figure 8:
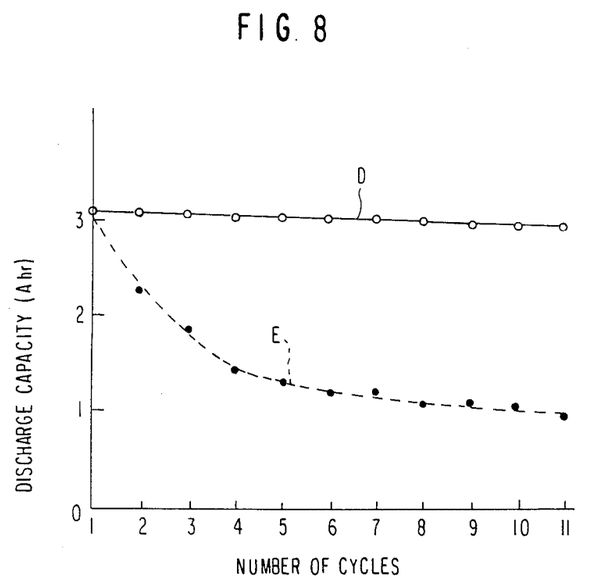
FIG. 8 shows the same comparison as in FIG. 7 except that a shut down period of one month was observed between one charge and discharge cycle and the following one.

3 Positive electrodes (40×60×0.9 mm) made in accordance with this invention in Example 1, 4 ordinary sintered cadmium negative electrodes (40×60×0.8 mm), nylon nonwoven fabric separators, and 9 ml of an aqueous potassium hydroxide solution having a specific gravity of 1.25 (20° C.) as an electrolyte were used to manufacture a rectangular cobalt (with nickel)-cadmium battery (D) made in accordance with this invention which used a synthetic resin cell provided with a safety valve and having a nominal capacity of 3 Ah. The battery was tested in charging and discharging cycles comprising 1 cA charging to 1.55 V at 25° C.; followed by 1 cA discharging to 0.5 V. For comparison, a sintered nickel-cadmium battery (E) manufactured by the same method as in (D) except employing the conventional positive electrodes prepared by using an aqueous mixed solution of cobalt nitrate and nickel nitrate having a cobalt content [{Co/(Co+Ni)}×100] of 10 wt % was tested for the same charging and discharging cycle test. The transition of discharge capacity as measured every fifty cycles with a recess time after every cycle set at 2 hours is shown in FIG. 7. As shown in FIG. 7, the discharge capacity of the battery (D) made in accordance with this invention hardly decreases even when the number of charge and discharge cycles reaches 500, whereas the discharge capacity of the conventional battery (E) markedly decreases before the number of the cycles reaches 50, so that it can be seen that the battery made in accordance with this invention is clearly superior to the conventional battery in performance. This seems to be due to the fact that the positive electrode of the battery made in accordance with this invention has a charge efficiency of about 100%, whereas the conventional positive electrode has a charge efficiency of only 80 to 90%. The transition of discharge capacity with the increase of charging and discharging cycles under the same charging and discharging conditions as in FIG. 7, except for provision of a recess time of 1 month after every cycle, is shown in FIG. 8. As shown in FIG. 8, there is a large difference between (D) and (E). The discharge capacity of the conventional battery (E) decreases rapidly as the number of charging and discharging cycles progresses, and becomes less than half the nominal capacity at the fourth cycle. On contrast to this, the discharge capacity of the battery (D) made in accordance with this invention hardly changes with the increase of cycles and is very stable. The above results mean that with the positive electrode of battery (E), the charge efficiency is significantly lowered and oxygen evolution, which is a competitive reaction, easily takes place when a recess time after each cycle extends to 1 month, whereas, with the positive electrode of the battery (D), the charge efficiency hardly lowers even when the recess time extends to 1 month. It is believed that when a conventional positive electrode comprising nickel hydroxide is allowed to stand for a long time in an aqueous alkaline solution after discharge, coarsening of the nickel hydroxide particles, ordering of the crystals, etc., occur during the standing period, so that a phenomenon termed "aging" involving oxygen evolution, which is a competitive reaction, easily takes place, and the charge efficiency is lowered when the electrode is charged after it has been allowed to stand for a long time. In contrast to this, in the positive electrode in accordance with this invention, it seems that the influence of the above-mentioned effects hardly appears, and the discharge capacity does not decrease even after it has been allowed to stand for 1 month. The charge efficiency of battery made in accordance with this invention is hardly lowered even after it has been allowed to stand for a long time, so that the battery needs not be overcharged to keep them free from an aging effect when charged and needs not be overcharged in a usual charge process. Therefore, a gas recombination reaction on cadmium negative electrode is hardly needed. This means that it is possible to manufacture a sealed battery using a rectangular case, instead of a cylindrical high pressure battery for gas consumption. Further, battery made in accordance with this invention is extremely advantageous because of the characteristic that a method for cutting off the charge by detecting a change of voltage in the end period of charge can be applied to the batteries over a wide temperature range for the potential difference of the positive electrode between the potential for oxygen evolution in the end period of charging and the potential in the process of charging is very large, viz., about 150 to 200 mV.

Therefore, according to this invention the sealed battery with high energy density which can be rapidly or super-rapidly charged at 0.3 to 5 cA by a method involving detecting a change of charge voltage to control the charging by the voltage can be manufactured. Such a thing has not been realized in the case of the conventional nickel-cadmium battery.

The open circuit potential of positive electrode made in accordance with this invention has a large change of from 200 to 400 mV, and also changes continuously as the electrodes are discharged, so that the charge capacity and discharge capacity can be determined by the change of the open circuit potential. An example of batteries made in accordance with this invention which use positive electrode according to this invention and zinc or cadmium as the negative electrode is described below with respect to the determination of capacity.

The constitutions of batteries were the same with those of already mentioned cobalt (with nickel)-zinc battery (A) and cobalt (with nickel)-cadmium battery (D).

Figure 9:
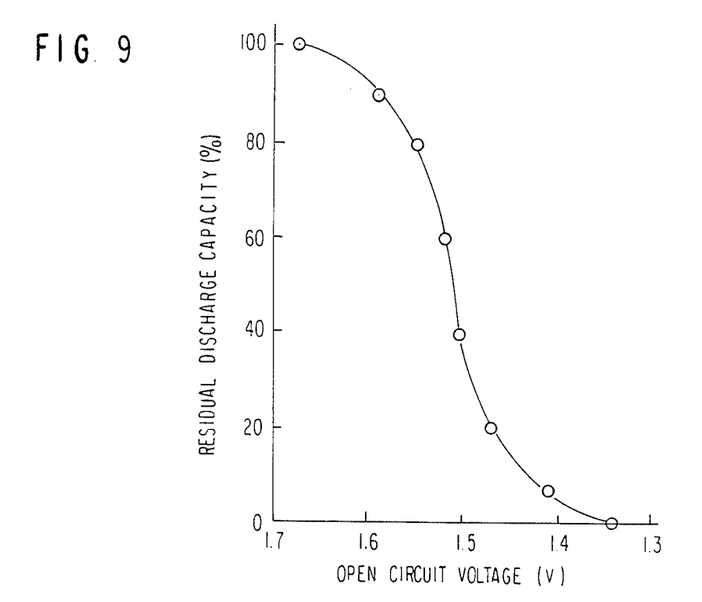
FIG. 9 and FIG. 10 show the relations between the residual discharge capacity and the open circuit voltage in a cobalt (with nickel)-zinc battery and in a cobalt (with nickel)-cadmium battery both made in accordance with this invention, respectively.
Figure 10:
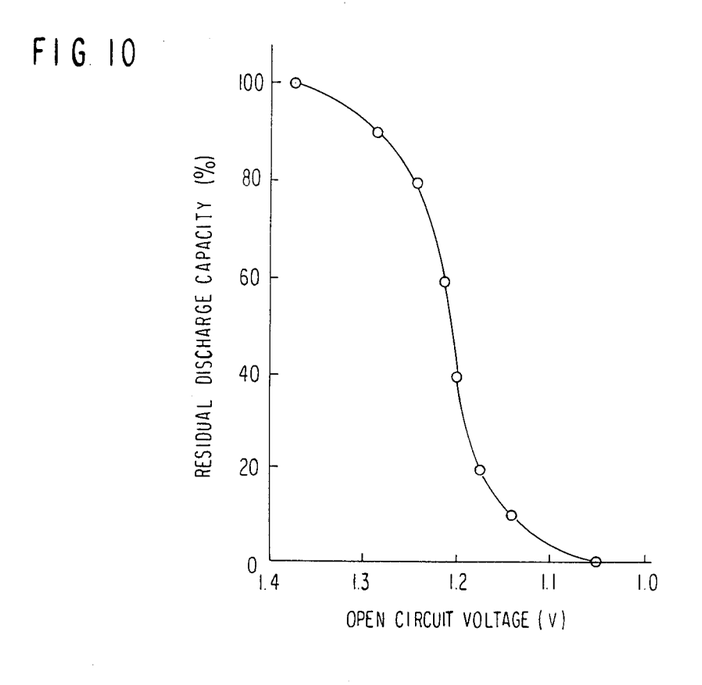

First, these batteries were charged at 25° C. and at 0.1 cA for a given time and then discharged to 0.5 V at 0.2 cA. The relations between the open circuit potential and the residual capacity for the cobalt (with nickel)-zinc battery and the cobalt (with nickel)-cadmium battery in this process are shown in FIG. 9 and FIG. 10, respectively. As shown in the figures, the residual capacity decreases as the open circuit potential lowers in both batteries. Therefore, it is possible to know the residual capacity accurately by the open circuit potential. Therefore, if the open circuit potential of these batteries is utilized to convert it into an appropriate display, the display can be used as an accurate residual capacity meter. Further, it can be also understood that one would be enabled to easily determine the charge state at any time by the open circuit voltage in the same way.

In the above, various alkaline batteries were manufactured using mainly positive electrodes prepared in Example 1 and effects of the invention were described with regard to those batteries. However, approximately the same effects would be achieved in cases wherein positive electrodes prepared as in Examples 2 to 8 are used. In particular, even mechanically weak positive electrodes employing non-sintered nickel substrates, as in Examples 2, 7 and 8, could provide long-life alkaline batteries by using active materials made in accordance with this invention. The reason is considered as follows.

The electrode prepared from the conventional active material needs overcharging and shows a considerable volume change during cycling. The oxygen evolution by overcharging and volume change caused by cycles weaken not only the degree of the connection with particles of the active material, but also the adhesion of active layer to a current collector, resulting in a short life.

On the contrary, the electrode prepared from the active material with good charge efficiency by this invention needs not overcharging and shows little volume change during cycling. This effect ensures a better connection with particles of the active material and a better adhesion of the active layer to current collector, resulting in a long life.

However, the reasons why the use of active materials made in accordance with this invention results in occurrence of the homogeneous phase redox system reaction which is quite different from the reaction system in conventional positive electrode comprising nickel hydroxide are not yet completely clear.

Figure 11:
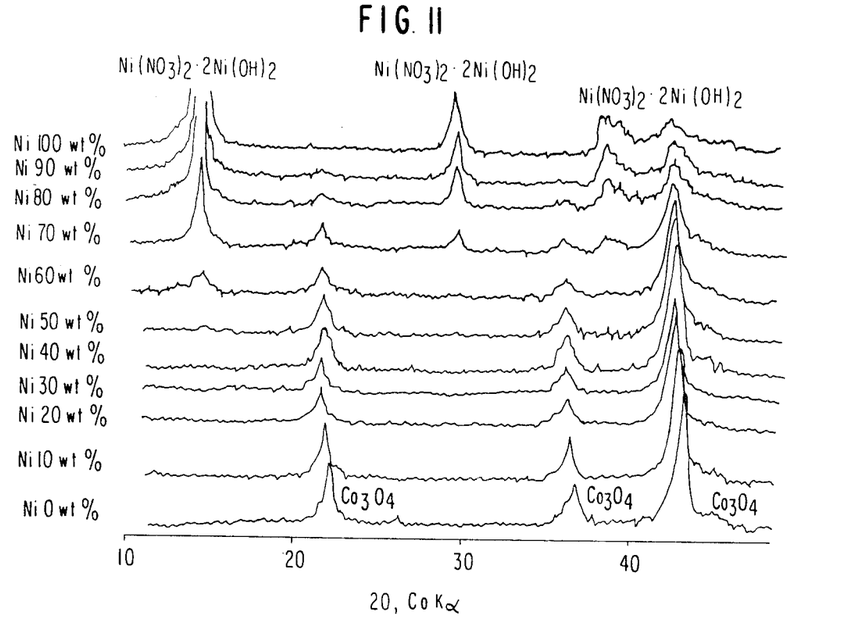
FIG. 11 shows the X-ray diffraction pattern of compounds resulting from a heat treatment of a mixed solution of cobalt and nickel in nitric acid at 230° C. and dried after being washed with hot water.
Figure 12:
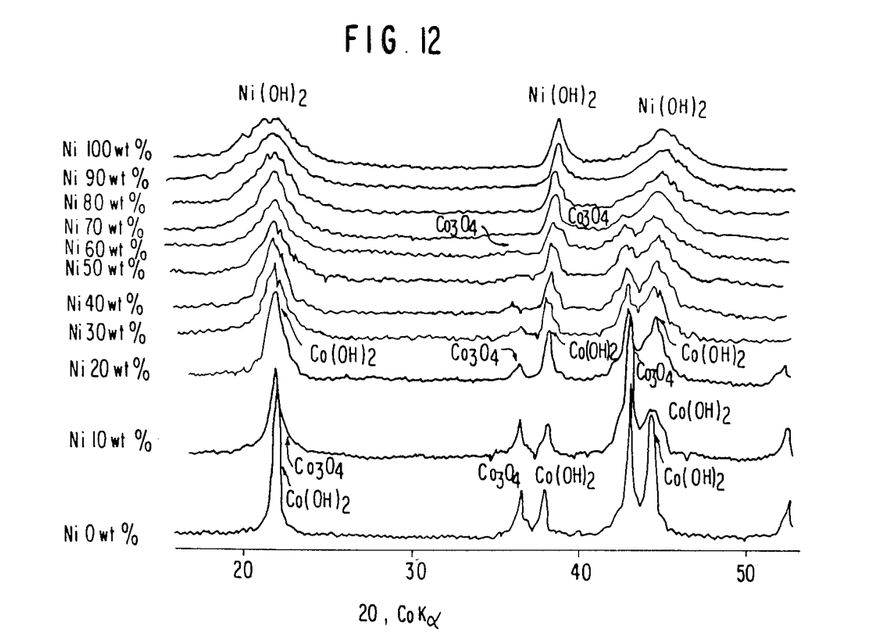
FIG. 12 shows the X-ray diffraction pattern of compounds obtained when products resulting from a heat treatment of a mixed solution of cobalt and nickel in nitric acid at 230° C. were dipped into an aqueous potassium hydroxide solution, washed with hot water and dried.

For a better understanding of the reason, change in the state of active materials when they are dipped into an aqueous potassium hydroxide solution was investigated. Two kinds of active materials were prepared by a method for putting into a molten state at 80° C. several mixtures of cobalt nitrate $Co(NO_3)_2.6H_2O$ and nickel nitrate $Ni(NO_3)_2.6H_2O$, each having a different mixing ratio, heat-treating them at 230° C. for 2 hours and then washing them with hot water followed by drying at 100° C. for 1 hour, and by another method for melting and heat-treating the same mixtures as the above in the same way as the above subsequently dipping them into an aqueous potassium hydroxide solution (sp. gr.=1.25 (20° C.) for 2 hours, and then washing them with hot water followed by drying at 100° C. for 1 hour, and the change in the state of active materials is investigated by X-ray diffraction analysis ($CoK_\alpha$). The X-ray diffraction patterns are shown in FIG. 11 and FIG. 12, respectively. The most significant characteristics resulting from a comparison of FIG. 11 and FIG. 12 are that, in the region of nickel content of from 100 to 70 wt %, sharp peaks of $Ni(NO_3)_2.2Ni(OH)_2$ are observed before dipping into an aqueous potassium hydroxide solution, whereas they disappear rapidly and peaks of $Ni(OH)_2$ are observed after dipping. This means that, in the region of nickel content of from 100 to 70 wt %, there occur abrupt changes in the crystal state of active materials. On the other hand, active materials made in accordance with this invention having a nickel content of from about 65 wt % and less are in an extremely stable state as compared with conventional active materials comprising nickel hydroxide, so that it would appear that a clear homogeneous redox system reaction takes place in the above-mentioned active materials. In FIG. 11 and FIG. 12, when the nickel content becomes less than 70 wt %, and particularly less than 60 wt %, peaks of $Co_3O_4$ are observed, from which it seems at a glance that the presence of $Co_3O_4$ has something to do with occurrence of homogeneous phase redox system reaction. However, as the discharge characteristics in FIG. 2 show, in active materials prepared by a method for simply neutralizing an aqueous acid mixed solution of cobalt nitrate and nickel nitrate with an aqueous alkaline solution, and in which $Co_3O_4$ is considered not to be formed, a clear homogeneous phase redox system reaction takes place. Therefore, the presence of $Co_3O_4$ does not seem to have anything to do with occurrence of the homogeneous phase redox system reaction, but the presence of $Co_3O_4$ does seem to play a roll in elevating the charging and discharging potential. In FIG. 12, when the nickel content becomes less than 20 wt %, peaks of $Co(OH)_2$ are observed. As previously mentioned, when $Co(OH)_2$ is once charged and oxidized or oxidized by dissolved oxygen in an aqueous alkaline solution, it is converted into cobalt oxyhydroxide, which hardly discharges, which thus lowers the utilization of the active materials.

Thus, alkaline storage batteries employing a positive electrode with a cobalt hydroxide base having a nickel content of from about 15 to 65 wt % in accordance with this invention are high energy-density batteries capable of being charged rapidly, and also have the property that the battery capacity can be easily determined by detection of the electromotive force of the battery.

While the invention has been described in detail and with reference to specific embodiments thereof, it will be apparent to one skilled in the art that various changes and modifications can be made therein without departing from the spirit and scope thereof.

What is claimed is:

1. An alkaline storage battery including a positive electrode comprising as an active material a cobalt hydroxide base containing from about 15 to 65 wt % nickel hydroxide with cobalt hydroxide present in an amount of above 20 wt. % of the cobalt hydroxide and nickel hydroxide mixture.

2. An alkaline storage battery including, as an active material of said positive electrode forming the battery, a product obtained by heat-treating a mixture or a mixed solution of cobalt nitrate and nickel nitrate having a nickel content of from about 15 to 65 wt %, based on the total amount of cobalt and nickel, at 110 to 300° C., and then dipping the resulting material into an aqueous alkaline solution.

3. An alkaline storage battery as in claim 1, which includes said positive electrode formed by applying a mixed powder of an active material of a cobalt hydroxide base containing from about 15 to 65 wt % nickel hydroxide, an electroconductive material, and a binding agent to a substrate to prepare the electrode.

4. An alkaline storage battery as in claim 1 including a negative electrode, wherein zinc is an active material of the negative electrode.

5. An alkaline storage battery as in claim 1 including a negative electrode, wherein cadmium is an active material of the negative electrode.

6. An alkaline storage battery as in claim 1, wherein an electric charge or discharge amount is controlled by turning off the current switch by means of voltage detector sensing its charge or discharge voltage a, respectively.

7. An alkaline storage battery as in claim 1 provided with a residual capacity meter which displays the residual capacity by detection of the electromotive force of the battery.

8. An alkaline storage battery as in claim 3, wherein the electroconductive material is graphite.

* * * * *